United States Patent
Shenfield (10) Patent No.: US 8,539,104 B2
(45) Date of Patent: Sep. 17, 2013

(54) SYSTEM AND METHOD FOR MIXED MODE DELIVERY OF DYNAMIC CONTENT TO A MOBILE DEVICE

(75) Inventor: Michael Shenfield, Richmond Hill (CA)

(73) Assignee: BlackBerry Limited, Waterloo (CA)

( * ) Notice: Subject to any disclaimer, the term of this patent is extended or adjusted under 35 U.S.C. 154(b) by 255 days.

(21) Appl. No.: 12/943,106

(22) Filed: Nov. 10, 2010

(65) Prior Publication Data

US 2012/0117165 A1    May 10, 2012

Related U.S. Application Data

(62) Division of application No. 11/423,475, filed on Jun. 12, 2006, now abandoned.

(51) Int. Cl.
*G06F 15/16*        (2006.01)
(52) U.S. Cl.
USPC ........... 709/246; 709/203; 709/217; 709/227; 709/229

(58) Field of Classification Search
USPC .................. 709/200–203, 217–227, 229, 246
See application file for complete search history.

(56) References Cited

U.S. PATENT DOCUMENTS

| | | | | |
|---|---|---|---|---|
| 6,253,326 | B1 * | 6/2001 | Lincke et al. | 726/12 |
| 7,137,143 | B2 * | 11/2006 | Chawla et al. | 726/12 |
| 7,216,177 | B1 * | 5/2007 | Strong et al. | 709/230 |
| 7,330,717 | B2 * | 2/2008 | Gidron et al. | 455/418 |
| 8,099,136 | B2 * | 1/2012 | Kawasaki et al. | 455/566 |
| 2006/0242231 | A1 * | 10/2006 | Kawasaki et al. | 709/203 |
| 2008/0090551 | A1 * | 4/2008 | Gidron et al. | 455/406 |
| 2010/0197357 | A1 * | 8/2010 | Kawasaki et al. | 455/566 |
| 2010/0293253 | A1 * | 11/2010 | Kaida | 709/219 |

* cited by examiner

*Primary Examiner* — Moustafa M Meky
(74) *Attorney, Agent, or Firm* — Moffat & Co.

(57) ABSTRACT

A method, system and apparatus for mixed mode delivery of content to a mobile device, the method having the steps of: receiving a subscription message including a filter; storing the filter; sending a subscription identifier; applying the filter to content available on the content provider, thereby producing a content subset; waiting for receipt of a content request; and forwarding the content subset upon receipt of the content request.

18 Claims, 6 Drawing Sheets

SYSTEM AND METHOD FOR MIXED MODE DELIVERY OF DYNAMIC CONTENT TO A MOBILE DEVICE

CROSS REFERENCE TO RELATED APPLICATIONS

The present application is a Divisional from U.S. application Ser. No. 11/423,475, filed Jun. 12, 2006.

FIELD OF THE APPLICATION

The present system and method relate to dynamic content delivery in a mobile environment and in particular to the mode of delivery of the dynamic content.

BACKGROUND

Users of mobile devices or mobile user equipment (UE) are increasingly becoming more sophisticated in terms of the functionality that they require from their mobile devices and the way that they access data from the mobile devices.

Dynamic content delivery allows users to have information or data pushed to them or allows users to pull the data from content providers. Examples of data could include stock quotes, weather updates, traffic updates, dynamic wallpaper, ads, applications or other data desirable to a user.

Content can be either pushed to a mobile device by a content provider or requested (pulled) from the content provider by the mobile device.

With pull-based delivery, the content is requested by a client application on the mobile device and delivered to the device in a response message. The problem with this approach is that the client application does not know about the availability of content from a content provider and needs to periodically pull content, thus wasting wireless bandwidth on unsuccessful attempts. This model does not provide a good user experience as frequent pull attempts affect network resources and ultimately the customer's monthly bill, while infrequent attempts result in outdated content.

With push mode delivery, the client application establishes a content subscription with a content provider. The application provides subscription filters that specify events of interest. The content provider applies the subscription filter to the available content, and if some content subset matches the filter, pushes this content to the mobile device using the available content delivery framework. This approach requires a complex content delivery infrastructure including subscription and content management on the push server and the content provider. The scalability for a large number of devices is a major obstacle for implementation, due to the complexity of managing multiple timer events and filters.

BRIEF DESCRIPTION OF THE DRAWINGS

The present application will be better understood with reference to the drawings in which.

DETAILED DESCRIPTION OF THE DRAWINGS

The present system and method overcome the limitations of the push-based and pull-based models of content delivery by providing for a mixed mode delivery model. The mixed mode delivery model combines the benefits of subscription based delivery with the simplicity of client application driven pull models. The mixed mode paradigm allows a client application to drive content delivery by either directly triggering the delivery of new content or registering interest in a new content with the delivery framework or content provider.

In the mixed mode delivery model, the event of content delivery is triggered when content available to a client application on the mobile device is exhausted. This could be when the data is either consumed or expires.

The mixed mode delivery model can work over either push bearers or pull bearers. In the case of pull bearers, the content provider waits until a pull message is received to send data. However, a filter sent during subscription initiation is stored at the content provider and applied to available content, preferably prior to the receipt of the pull message.

In a push bearer solution, the content provider can be adapted to push content only upon receipt of a message that the client application is ready for content. If no content is available when the client application indicates it is ready, a flag can be set to push the next available content subset immediately. In the push bearer solution, the filter received from the client application upon subscription is stored by the content provider and needs only be sent once.

In both the push and pull bearer solutions, some of the processing can be transferred to a content delivery server. Specifically, the content delivery server can store a subscription identifier, and can cache content subsets, apply rules to the content subset, and wait to receive a request for more content before forwarding the content to the client application.

The present application therefore provides a method in a content provider for mixed mode delivery of content comprising the steps of: receiving a subscription message including a filter; storing the filter; sending a subscription identifier; applying the filter to content available on the content provider, thereby producing a content subset; waiting for receipt of a content request; and forwarding the content subset upon receipt of the content request.

The present application further provides a system for mixed mode delivery of content to a mobile device comprising: a client application on the mobile device, the client application adapted to: send a subscription message including a filter; consume content; identify expired content; and send a content request when all content for the client application is consumed or has expired; and a content provider, said content provided adapted to: receive the subscription message and the filter; store the filter; send a subscription identifier; apply the filter to content available, thereby producing a content subset;

wait for receipt of a content request; and forward the content subset upon receipt of the content request.

The present application still further provides a client application on a mobile device for use in a mixed mode delivery system, the client application being characterized by: means for sending a subscription message including a filter to a content provider; means for receiving content from the content provider; means for consuming the content; means for identifying expired content; and means for sending a content request when all content for the client application is consumed or has expired.

The present application further provides a content provider for use in a mixed mode delivery system, the content provider characterized by: means for receiving a subscription message and a filter from a client application; storage means for storing the filter; communication means for sending a subscription identifier; means for applying the filter to available content, thereby producing a content subset; means for waiting for receipt of a content request; and means for forwarding the content subset upon receipt of the content request.

Figure 1:
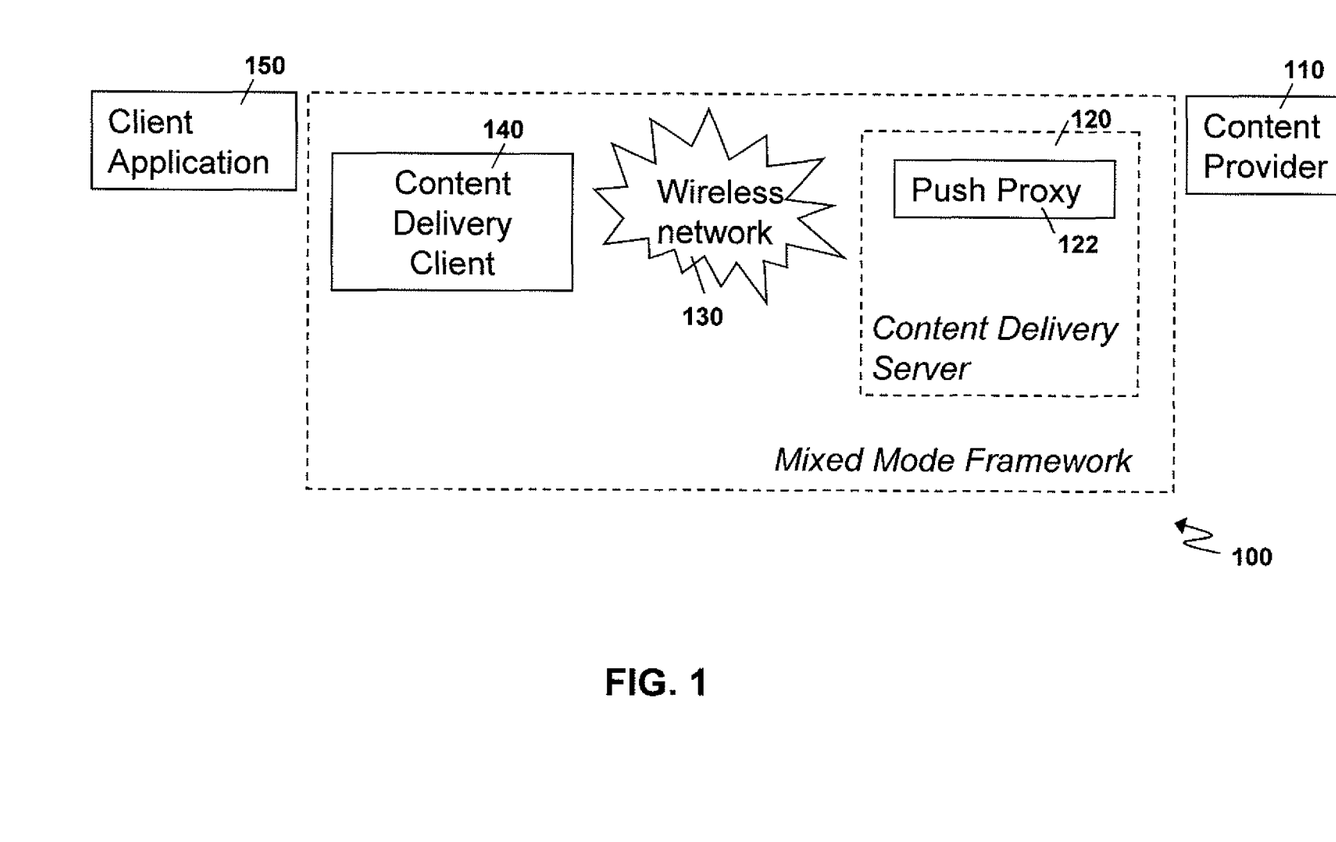
FIG. 1 is a block diagram of a basic architecture for a dynamic content delivery system.

Reference is now made to FIG. 1. A generic hybrid system for delivering dynamic content to a client application is illustrated. A system of FIG. 1 is a simplified system and shows logical components that need to be in the dynamic content delivery architecture; however, one skilled in the art will appreciate that other components could exist or that various components could be grouped together.

Architecture 100 includes a content provider 110. Content provider 110 is arranged to provide a dynamic content to users that are subscribed with content provider 110. Examples can include, for example, a website selling books. A user may register with content provider 110 to obtain a list of newly released books within specified genres. Other examples could include news sites that might provide headlines to users on a periodic basis, traffic sites that might provide up-to-date traffic information to users during certain periods of the day. Stock market sites that could provide updated stock quotes or currency exchange rate to users, among others.

Depending on the bearers used, content provider 110 may register with a content delivery server 120 in order to allow clients of the content delivery server to receive content from content provider 110. As will be appreciated, when using push bearers registration is required. When using pull bearers, registration is optional.

Content delivery server 120, in one embodiment, includes a push proxy 122 that acts as a proxy for a client or a client application and provides a destination for content provider 110 to send content. The push proxy is used in push mode, but not in pull mode Content delivery server 120 communicates over wireless network 130 with a content delivery client 140 that is located on a mobile device. Content delivery client 140 receives content that is being delivered from content provider 110 and can communicate the content with a client application 150, which ultimately consumes the content.

Within the present specification, reference to content provider 110, content delivery server 120, push proxy 122, wireless network 130, content delivery client 140 or client application 150 is a reference back to the architecture of FIG. 1.

Depending on the infrastructure, various forms of mixed mode deliveries exist. These depend on whether the infrastructure is a push-based or a pull-based infrastructure.

Figure 2:
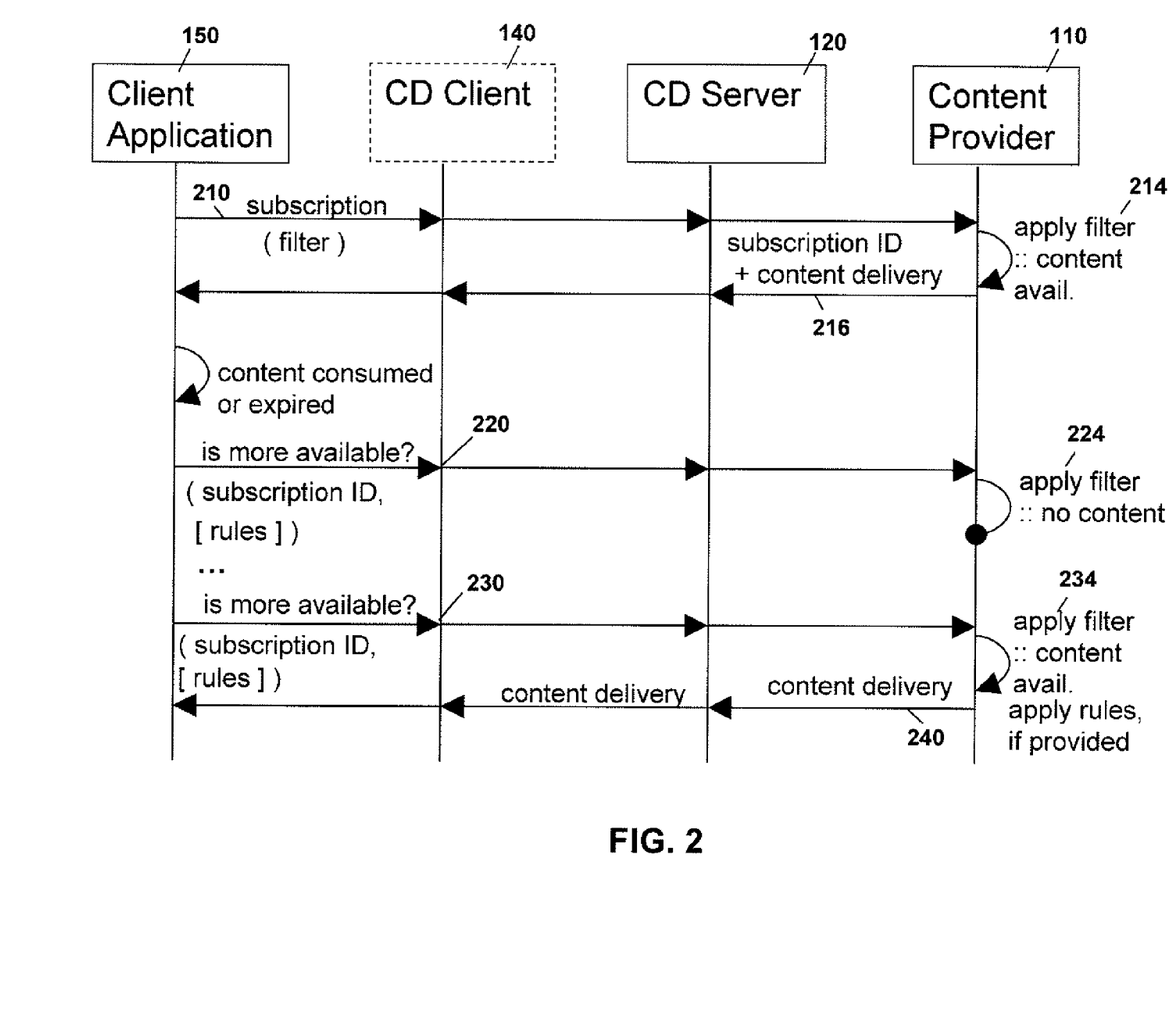
FIG. 2 is a flow diagram showing message and content passing between a client application and a content provider for a content delivery framework over pull bearer.

Referring to FIG. 2, FIG. 2 illustrates a mixed mode delivery framework for delivery over pull bearers.

Client application 150, upon subscription to a content provider 110, sends a subscription message along with a filter in message 210. As will be appreciated by those skilled in the art, the filter sent in message 210 describes the type and format of the data that the client application 150 is expecting. Examples of filters could include stock quotes for specific companies. Further, the filter could go into more detail including an indication that the stock quote should only be sent when the change in the price of the stock is greater than 1% of its previously sent market value, when trading reaches a certain volume, etc. A filter could also indicate a schedule for pushing content.

Message 210 is forwarded by content delivery client 140, through content delivery server 120, to content provider 110.

When content provider 110 receives message 210, it establishes a new subscription, extracts and applies the filter to available content in step 214.

In message 216, content provider 110 sends a subscription identifier along with any content that was available that met the filter criteria back to client application 150.

As will be appreciated by those skilled in the art, mixed mode delivery over pull bearers is synchronous. Message 216 therefore can include both the content and the subscription ID as a response message and could be, for example, an HTTP response.

Client application 150 subsequently consumes the content that was delivered in message 216. The client application 150 can either immediately display the content to the end user, such as with dynamic wallpaper, news marquees, etc., or store the content until a user request it. A user has consumed the content when all videos delivered are watched, audio delivered is listened to, tasks from the delivery list of tasks completed, etc.

Alternatively, content can expire. For example, weather forecasts, movie listings, stock quotes, etc. all have a time within which they are valid, after which the content has expired. If a client application has not consumed the content before it expires, the content can be ignored by client application 150 after it has expired.

Once client application 150 has consumed the content or the content has expired, the client application 150 sends message 220 to content provider 110. Message 220 includes a request for any further content, if available. The message further includes the subscription identifier previously received by client application 150 and any rules that client application 150 wishes to apply to the content. As will be appreciated, no rule needs to be sent and the implementation and processing of rules is optional.

Rules are applied on top of the filter and are therefore applied to the content subset that has previously been filtered by content provider 110. Rules can indicate how the content is delivered, including the ordering, the maximum size of the content that can be received and the priority affecting content ordering and/or selection, the timing of the receipt of the content or other rules that would be known to those skilled in the art.

In the example of FIG. 2, content provider 110 receives message 220 and finds that no content is available in step 224. The client application 150 receives an empty response or a response indicating that there is no content available.

At a subsequent time, client application 150 can again attempt to pull content through message 230 asking if further content is available, while sending a subscription identifier and rules for the content to content provider 110. In step 234, content provider 110 applies the filter and finds that content is available, at which point it generates a message 240 in which content is delivered back to client application 150. As will be appreciated by those skilled in the art, content provider 110 can also apply the rules that were passed to it in message 230.

As will also be appreciated, message 240 does not need to return a subscription identifier since client application 150 already knows its subscription identifier.

In one embodiment of the present application, content provider 110 could apply a filter to content as the content becomes available. As will be appreciated, matching content with the subscription filter could be time consuming, and the benefit of the mixed mode delivery model is that a content subset based on the subscription filter could be prepared prior to a request from client application 150, thereby eliminating delay and user latency.

The mixed mode delivery of FIG. 2 is friendlier for mobile devices than a simple pull-based model since there is no need to pass a subscription filter over the air each time. Further, as indicated above, the use of the filter prior to a pull message being received could eliminate delays in user latency.

As will be further appreciated by those skilled in the art, the content delivery client 140 and content delivery server 120 are redundant in the model of FIG. 2 and client application 150 could communicate directly with content provider 110.

Figure 3:
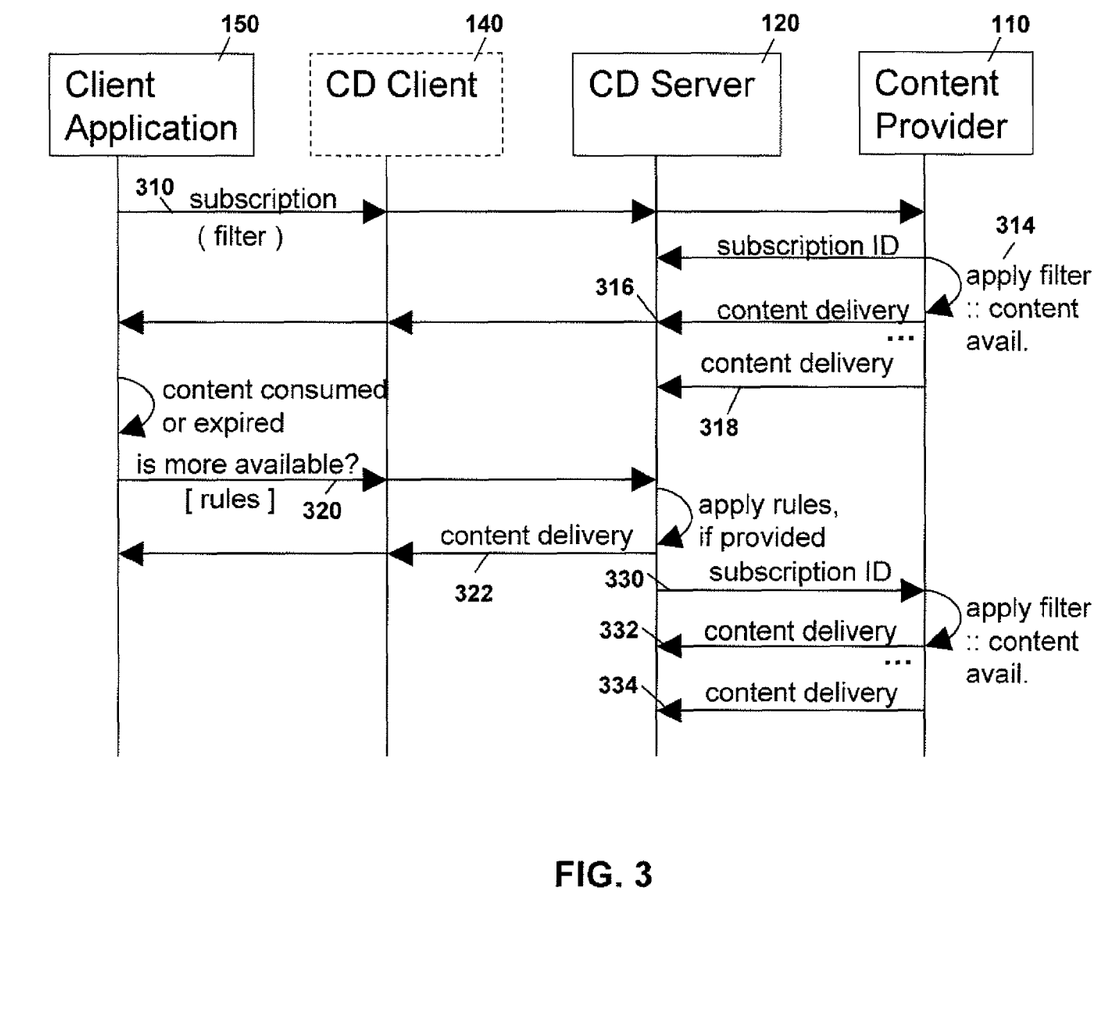
FIG. 3 is a flow diagram showing message and content passing between a client application and a content provider for a content delivery framework over pull bearer with a content delivery server managing subscriptions and catching content.

A further alternative embodiment is presented in FIG. 3. FIG. 3 again illustrates a mixed mode delivery over pull bearers. However, in the example of FIG. 3, the content delivery server provides subscription management and content catching services, thereby removing these functions from the client application 150 and the content provider 110.

Referring to FIG. 3, a client application 150 sends a subscription message 310 to content provider 110. The subscription message 310 includes a filter to indicate what content should be received from content provider 110. This message is passed through the content delivery client 140, the content delivery server 120 to content provider 110.

Upon receipt of the subscription message 310 by content provider 110, content provider 110 provides a subscription identifier to content delivery server 120.

Content provider 110 further applies a filter received in message 310 to content stored by content provider 110 and finds available content for delivery to client application 150. This is performed in step 314.

Alternatively, upon subscription, the response message is processed by the content delivery server 120 and the subscription information (for example, a match between the device identifier and the subscription identifier) is extracted and stored for future use. As will be appreciated, the subscription identifier is used by the content delivery server 120 to indicate to content provider 110 that content should be sent. The above could be implemented by providing subscription identifiers in the header of the HTTP request or as a separate part of a multi-part message. The response stripped of the subscription identifier is returned to the client application 150.

Content provider 110 generates a message 316 to deliver the content found in step 314. The content delivery message 316 is forwarded through content delivery server 120 to client application 150.

As will be further appreciated, content provider 110 could continue to apply the filter to various content and rather than, or in addition to, delivering content in step 316, when further content is discovered for delivery to client application 150, it can be sent in a message 318.

Content delivery server 120 receives message 318 and caches the message until the content is requested by client application 150.

Once client application 150 has consumed the content provided by message 316, or the data in message 316 has expired, client application 150 can generate a new message 320 asking for more content and also providing rules for the content. Message 320 is passed to content delivery server 120.

Content delivery server 120 receives message 320, and applies the rules that were passed in message 320 if any rules are provided. Further, content delivery server 120 passes message 322, which contains the content that was delivered in message 318 to client application 150.

As will further be appreciated, content delivery message 322 does not necessarily contain all of the cached content from the content delivery server 120. The rules may specify a certain size of cache content, or content delivery server 120 may have certain rules as to the amount of data that is passed to client application 150, and only a portion of the data may be passed while the remainder is kept in the cache of content delivery server 120 until a subsequent request is received from client application 150.

Once all of the content is delivered from the cache of content delivery server 120, content delivery server 120 can further generate a message 330 that includes the subscription identifier that was previously passed to it. Content provider 110 receives message 330 and message 330 is used to trigger the application of the filter to available content to see whether there is more content available for delivery. Content provider 110 can thereafter generate messages 332 and 334 as illustrated in FIG. 3.

Message 330 simplifies the procedure for content provider 110. Content provider 110 does not have to constantly apply a filter content as it is generated or received, allowing the process to be more scalable for a larger number of subscribers and simplifying the process that needs to be performed by content provider 110. Specifically, the filter does not need to be applied until message 330 is received from content delivery server 120.

Content delivery server 120 caches content delivery messages 332 and 334 until a message is received from client application 150 asking for more content.

The embodiment of FIG. 3 thereby provides for some of the processing and caching to be performed by content delivery server 120, removing some of the burden from content provider 110. The mixed mode model of FIG. 3 provides for a reduction in the network resources required by only sending a subscription message with a filter once to content server 120 and content provider 110. Further, content is filtered prior to be passed back to client application 150 and it is only delivered when client application 150 requests the content to be delivered. In the example of FIG. 3, this is only when previous content has either been consumed or has expired.

Figure 4:
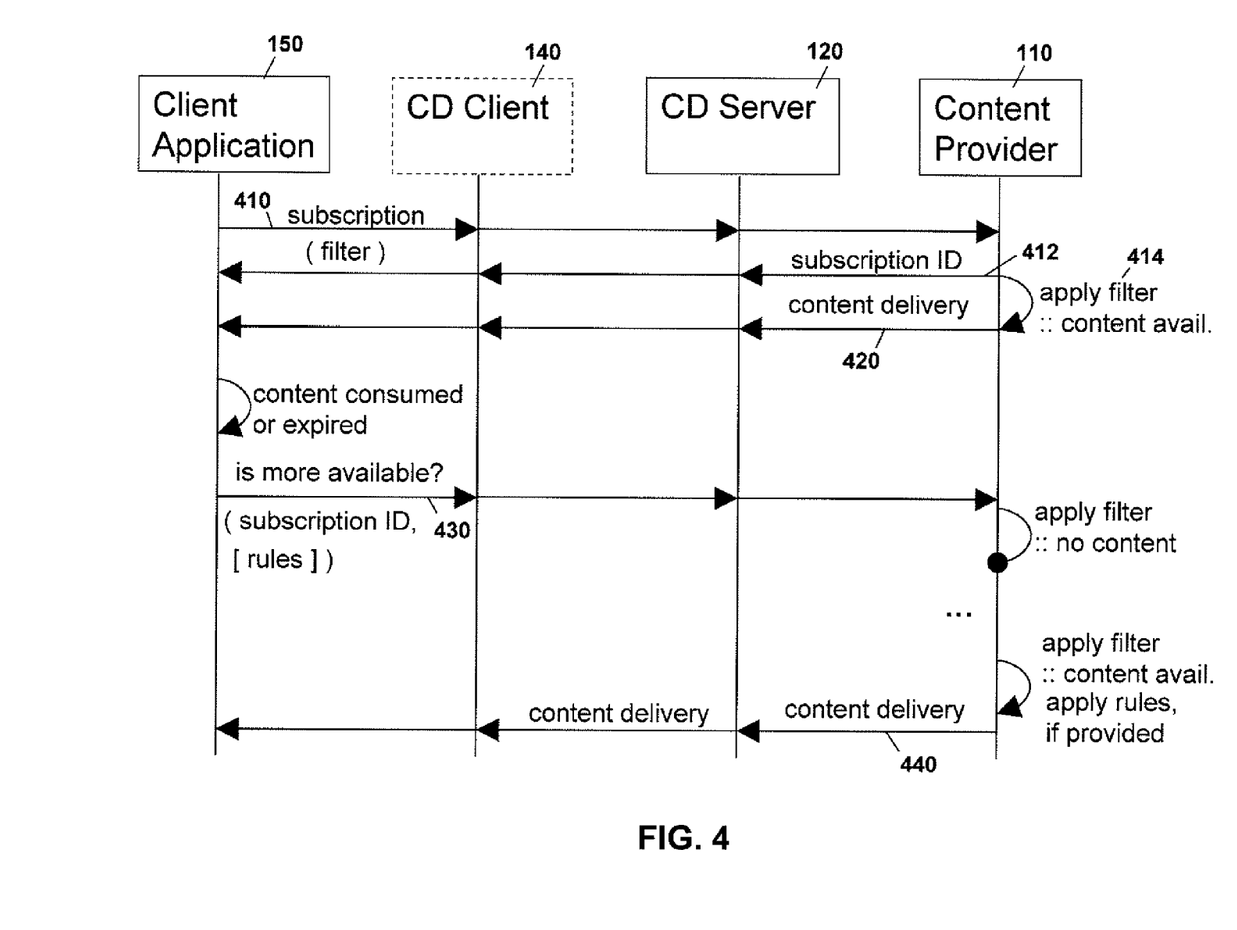
FIG. 4 is a flow diagram showing message and content passing between a client application and a content provider for a content delivery framework over push bearer.

Reference is now made to FIG. 4. FIG. 4 provides the framework for a mixed mode delivery system over a push bearer.

Client application 150 sends a subscription message 410, which includes a filter, to content provider 110. The content provider upon receipt of the message 410, registers the subscription and returns a subscription ID in message 412.

In step 414, the filter is applied to available content and content provider 110 pushes a matching content subset to client application 150 in message 420.

Client application 150 consumes content or the content expires as described above, and once the content is consumed or expired, client application 150 generates a message 430 requesting further content from content provider 110. Message 430 includes the subscription identifier along with any rules that the client application may wish to be applied to a content subset.

In the example of FIG. 4, content provider 110 receives message 430 and applies the filter, finding that no content is available. However, when the message is received, a flag is added to content provider 110 indicating client application 150 desires more content. Thereafter, when further content does become available, it should be pushed to client application 150.

As further illustrated in FIG. 4, when new content arrives at content provider 110, a filter is applied and content is found to be available. Subsequently, content provider 110 generates message 440, which is pushed to client application 150.

As compared with traditional push based models, the mixed mode delivery model illustrated in FIG. 4 is more efficient. Information is delivered to client application 150 only when the client application 150 and the mobile device are ready to consume the information. The delivery event is directly triggered by the application, and there is therefore no need for complex event or timer management frameworks. Further, the client application could optionally also specify a push schedule in the delivery rules found in message 430. This could therefore result in a combination of mixed mode and push mode behaviors.

Figure 5:
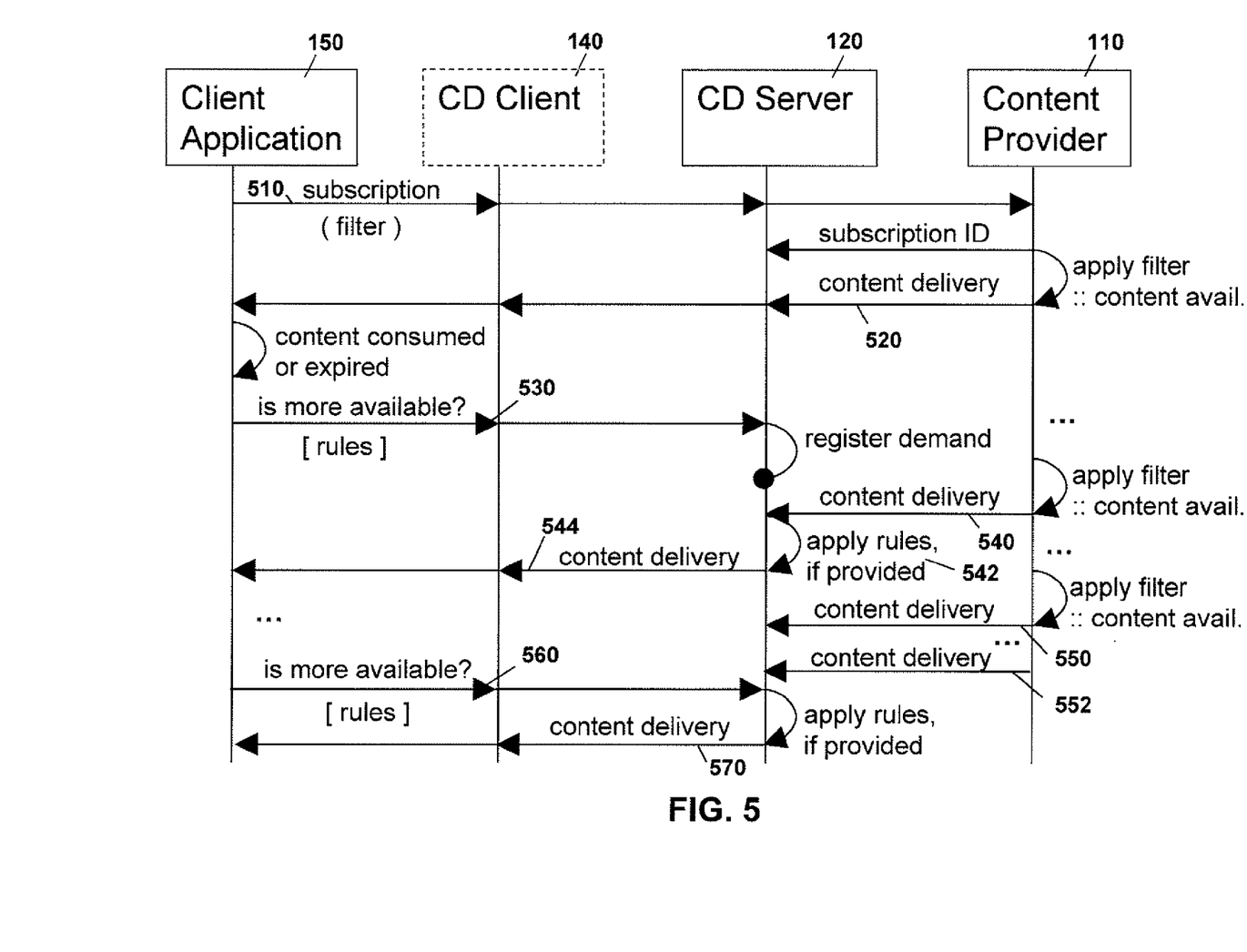
FIG. 5 is a flow diagram showing message and content passing between a client application and a content provider for a content delivery framework over push bearer with a content delivery server managing subscriptions and catching content.

In an alternative embodiment as illustrated in FIG. 5, content delivery server 120 provides subscription management and content caching functionality.

Referring to FIG. 5, client application 150 sends subscription message 410 including a filter to content provider 110 through content delivery server 120.

Content provider 110 generates a subscription identifier and sends this to content delivery server 120. Further, the filter that was received in message 510 is applied to available content and a content delivery message 520 is generated by content provider 110 and sent to client application 150.

Client application 150 consumes the content delivered through a message 520 and once the content is consumed or expired, client application 150 generates a message 530 asking for further available content and optionally passing rules. Message 530 is sent to content delivery server 120, which receives the content and registers that client application 150 wishes to receive more information.

In the example of FIG. 5, no content is stored in the cache on content delivery server 120 at the time it receives message 530 and therefore nothing is sent back to client application 150.

When content provider 110 receives further content and applies the filter to this content, once applicable content is found this applicable content is pushed to content delivery server 120 using message 540. Content delivery server 120 caches this content, and in the case of FIG. 5 when client application 150 has previously registered demand for new content, the rules are applied in step 542 and the content is delivered in message 544. Conversely, if no demand has been registered, then content delivery server 120 will cache content, as illustrated by content received from messages 550 and 552. As will be appreciated from the above, an additional benefit of mixed mode over push bearer involves saving the delivery of expired content, or replacing not yet delivered content. If content that is cached on content delivery server 120 and waiting for client application 150 to trigger a push expires or is replaced with more up-to date content, the content delivery server 120 can drop the expired content. This saves network resources and user payments for wireless delivery of content that user did not or could not consume.

A similar benefit also exists for the model of FIG. 4, where content waiting on the content provider 110 but yet pushed can be replaced before it is pushed if the content has expired or been replaced. Again, the trigger by the client application 150 saves the sending of content that the user cannot consume.

In the example of FIG. 5, client application consumes content from content delivery message 544 and once the content has either been consumed or has expired a new message 560 is generated which is sent to content delivery server 120.

Content delivery server 120 applies rules to any content that is stored in its cache and subsequently delivers the content in message 570 to client application 150.

The above mixed delivery mode over push bearers thereby provides certain advantages. Functionality is moved from content provider 110 to content delivery server 120. Further, data is only passed to client application 150 when client application 150 is ready for this data.

As will be appreciated by those skilled in the art, the mixed mode delivery model requires that content provider 110 be adapted to store filters for client applications 150 and to apply those filters to available content. However, filtering can be done periodically rather than only when a message with filters is received from client application 150.

Content provider 110 is further required to implement a flag for the embodiment of FIG. 4 in which the content is cached on content provider 110 until client application 150 is ready for it. This functionality is moved to the content delivery server 120 in the embodiment of FIG. 5.

Figure 6:
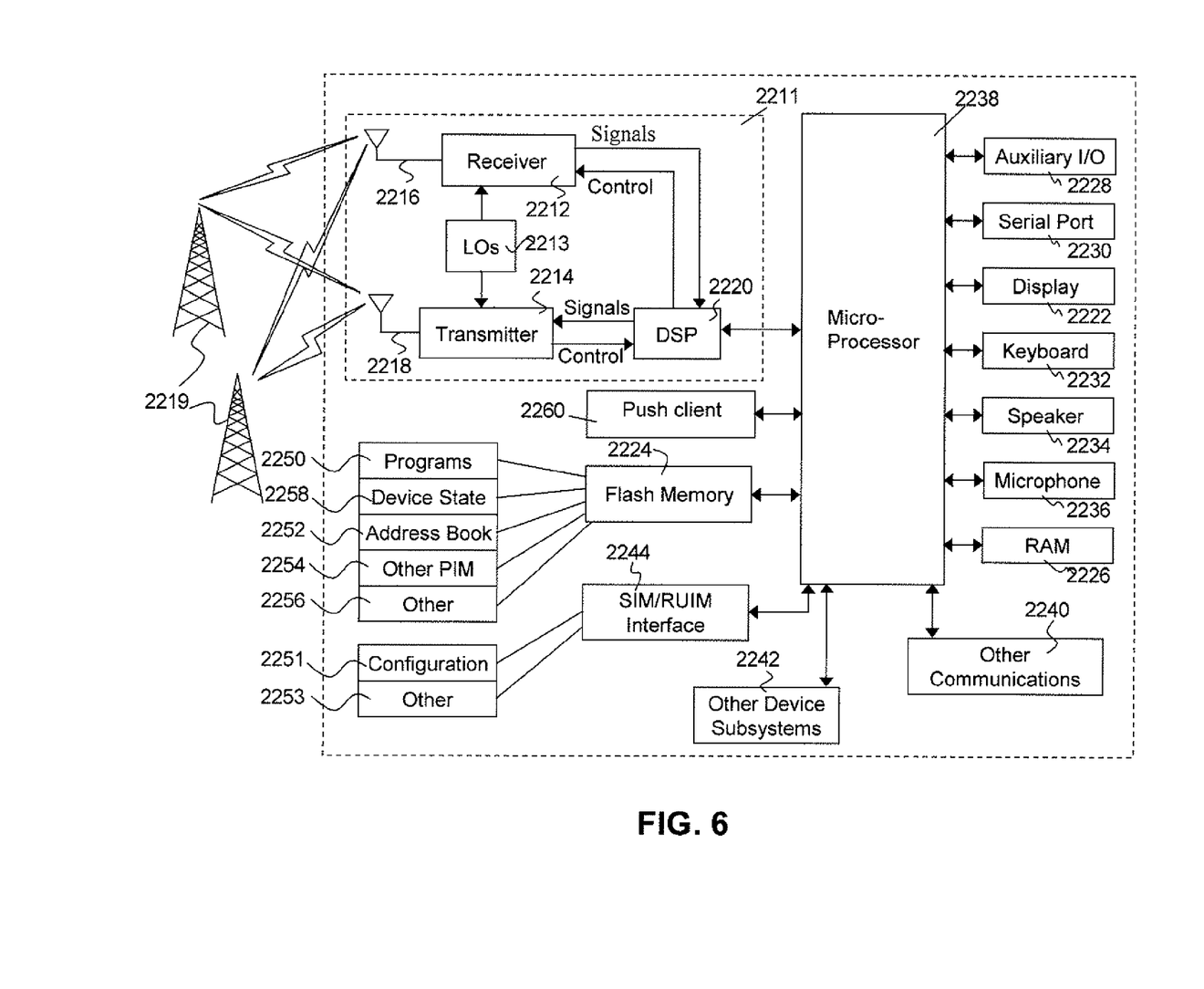
FIG. 6 is a block diagram of an exemplary mobile device that could be used in association with the present method and system.

As will be appreciated by those skilled in the art, the above can be implemented on any mobile data device and reference is now made to FIG. 6 in which an exemplary mobile device is illustrated. This is not meant to limit the present application and any mobile data device could be used.

FIG. 6 is a block diagram illustrating a mobile device apt to be used with preferred embodiments of the apparatus and method of the present application. Mobile device 2200 is preferably a two-way wireless communication device having at least voice and data communication capabilities. Mobile device 2200 preferably has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, or a data communication device, as examples.

Where mobile device 2200 is enabled for two-way communication, it will incorporate a communication subsystem 2211, including both a receiver 2212 and a transmitter 2214, as well as associated components such as one or more, preferably embedded or internal, antenna elements 2216 and 2218, local oscillators (LOs) 2213, and a processing module such as a digital signal processor (DSP) 2220. As will be apparent to those skilled in the field of communications, the particular design of the communication subsystem 2211 will be dependent upon the communication network in which the device is intended to operate.

Network access requirements will also vary depending upon the type of network 2219. In some CDMA networks network access is associated with a subscriber or user of mobile device 2200. A CDMA mobile device may require a removable user identity module (RUIM) or a subscriber identity module (SIM) card in order to operate on a CDMA network. The SIM/RUIM interface 2244 is normally similar to a card-slot into which a SIM/RUIM card can be inserted and ejected like a diskette or PCMCIA card. The SIM/RUIM card can have approximately 64K of memory and hold many key configuration 2251, and other information 2253 such as identification, and subscriber related information.

When required network registration or activation procedures have been completed, mobile device 2200 may send and receive communication signals over the network 2219. As illustrated in FIG. 6, network 2219 can consist of multiple base stations communicating with the mobile device. For example, in a hybrid CDMA 1× EVDO system, a CDMA base station and an EVDO base station communicate with the mobile device and the mobile device is connected to both simultaneously. The EVDO and CDMA 1× base stations use different paging slots to communicate with the mobile device.

Signals received by antenna 2216 through communication network 2219 are input to receiver 2212, which may perform such common receiver functions as signal amplification, frequency down conversion, filtering, channel selection and the like, and in the example system shown in FIG. 6, analog to digital (ND) conversion. A/D conversion of a received signal allows more complex communication functions such as demodulation and decoding to be performed in the DSP 2220. In a similar manner, signals to be transmitted are processed, including modulation and encoding for example, by DSP 2220 and input to transmitter 2214 for digital to analog conversion, frequency up conversion, filtering, amplification and transmission over the communication network 2219 via antenna 2218. DSP 2220 not only processes communication signals, but also provides for receiver and transmitter control. For example, the gains applied to communication signals in receiver 2212 and transmitter 2214 may be adaptively controlled through automatic gain control algorithms implemented in DSP 2220.

Mobile device 2200 preferably includes a microprocessor 2238 which controls the overall operation of the device. Communication functions, including at least data and voice communications, are performed through communication subsystem 2211. Microprocessor 2238 also interacts with further device subsystems such as the display 2222, flash memory 2224, random access memory (RAM) 2226, auxiliary input/output (I/O) subsystems 2228, serial port 2230, two or more keyboards or keypads 2232, speaker 2234, microphone 2236, other communication subsystem 2240 such as a short-range communications subsystem and any other device subsystems generally designated as 2242. Serial port 2230 could include a USB port or other port known to those in the art.

Some of the subsystems shown in FIG. 6 perform communication-related functions, whereas other subsystems may provide "resident" or on-device functions. Notably, some subsystems, such as keyboard 2232 and display 2222, for example, may be used for both communication-related functions, such as entering a text message for transmission over a communication network, and device-resident functions such as a calculator or task list.

Operating system software used by the microprocessor 2238 is preferably stored in a persistent store such as flash memory 2224, which may instead be a read-only memory (ROM) or similar storage element (not shown). Those skilled in the art will appreciate that the operating system, specific device applications, or parts thereof, may be temporarily loaded into a volatile memory such as RAM 2226. Received communication signals may also be stored in RAM 2226.

As shown, flash memory 2224 can be segregated into different areas for both computer programs 2258 and program data storage 2250, 2252, 2254 and 2256. These different storage types indicate that each program can allocate a portion of flash memory 2224 for their own data storage requirements. Microprocessor 2238, in addition to its operating system functions, preferably enables execution of software applications on the mobile device. A predetermined set of applications that control basic operations, including at least data and voice communication applications for example, will normally be installed on mobile device 2200 during manufacturing. Other applications could be installed subsequently or dynamically.

A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 2219. In a preferred embodiment, the PIM data items are seamlessly integrated, synchronized and updated, via the wireless network 2219, with the mobile device user's corresponding data items stored or associated with a host computer system. Further applications may also be loaded onto the mobile device 2200 through the network 2219, an auxiliary I/O subsystem 2228, serial port 2230, short-range communications subsystem 2240 or any other suitable subsystem 2242, and installed by a user in the RAM 2226 or preferably a non-volatile store (not shown) for execution by the microprocessor 2238. Such flexibility in application installation increases the functionality of the device and may provide enhanced on-device functions, communication-related functions, or both. For example, secure communication applications may enable electronic commerce functions and other such financial transactions to be performed using the mobile device 2200.

In a data communication mode, a received signal such as a text message or web page download will be processed by the communication subsystem 2211 and input to the microprocessor 2238, which preferably further processes the received signal for output to the display 2222, or alternatively to an auxiliary I/O device 2228. A push client 2260, which could be equivalent to push clients 140 and 510, could also process the input.

A user of mobile device 2200 may also compose data items such as email messages for example, using the keyboard 2232, which is preferably a complete alphanumeric keyboard or telephone-type keypad, in conjunction with the display 2222 and possibly an auxiliary I/O device 2228. Such composed items may then be transmitted over a communication network through the communication subsystem 2211.

For voice communications, overall operation of mobile device 2200 is similar, except that received signals would preferably be output to a speaker 2234 and signals for transmission would be generated by a microphone 2236. Alternative voice or audio I/O subsystems, such as a voice message recording subsystem, may also be implemented on mobile device 2200. Although voice or audio signal output is preferably accomplished primarily through the speaker 2234, display 22422 may also be used to provide an indication of the identity of a calling party, the duration of a voice call, or other voice call related information for example.

Serial port 2230 in FIG. 6, would normally be implemented in a personal digital assistant (PDA)-type mobile device for which synchronization with a user's desktop computer (not shown) may be desirable, but is an optional device component. Such a port 2230 would enable a user to set preferences through an external device or software application and would extend the capabilities of mobile device 2200 by providing for information or software downloads to mobile device 2200 other than through a wireless communication network. The alternate download path may for example be used to load an encryption key onto the device through a direct and thus reliable and trusted connection to thereby enable secure device communication. As will be appreciated by those skilled in the art, serial port 2230 can further be used to connect the mobile device to a computer to act as a modem.

Other communications subsystems 2240, such as a short-range communications subsystem, is a further optional component which may provide for communication between mobile device 2200 and different systems or devices, which need not necessarily be similar devices. For example, the subsystem 2240 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method performed by a delivery server, comprising:
   receiving, at the delivery server, a first subscription message from a delivery client on a mobile device, the first subscription message including a subscription filter that specifies content of interest for a content-consuming application on the mobile device;
   sending to a content provider server after the receiving, a second subscription message which is different from the first subscription message, the second subscription message including the subscription filter for establishing a subscription to the content of interest on behalf of the content-consuming application;
   receiving, at the delivery server after the sending, a message from the content provider server that includes the content of interest and an identifier that identifies the subscription;
   receiving, at the delivery server, a rule specifying how the content of interest is to be delivered to the delivery client; and
   delivering a subset of the content of interest to the delivery client according to the rule.

2. The method of claim 1 wherein the rule specifies a priority for the ordering.

3. The method of claim 1 wherein the rule specifies a size for the content of interest.

4. The method of claim 3 wherein delivering comprises:
   sending a first portion of the content of interest that is less than or equal to the size specified by the rule; and
   caching a second portion of the content of interest, the first and second portions being an entirety of the content of interest.

5. The method of claim 4 wherein delivering further comprises:
   receiving, at the delivery server after sending the first portion, a request for the second portion.

6. The method of claim 1 wherein the rule specifies timing for delivery of the content of interest.

7. A computing device comprising:
   a processor executing a delivery server which is configured for:
   receiving a first subscription message from a delivery client on a mobile device, the first subscription message including a subscription filter that specifies content of interest for a content-consuming application on the mobile device;
   sending to a content provider server after the receiving, a second subscription message which is different from the first subscription message, the second subscription message including the subscription filter for establishing a subscription to the content of interest on behalf of the content-consuming application;
   receiving, after the sending, a message from the content provider server that includes the content of interest and an identifier that identifies the subscription;
   receiving a rule specifying how the content of interest is to be delivered to the delivery client; and
   delivering a subset of the content of interest to the delivery client according to the rule.

8. The computing device of claim 7 wherein the rule specifies a priority for the ordering.

9. The computing device of claim 7 wherein the rule specifies a size for the content of interest.

10. The computing device of claim 9 wherein delivering comprises:
    sending a first portion of the content of interest that is less than or equal to the size specified by the rule; and
    caching a second portion of the content of interest, the first and second portions being an entirety of the content of interest.

11. The computing device of claim 10 wherein delivering further comprises:
    receiving, after sending the first portion, a request for the second portion.

12. The computing device of claim 7 wherein the rule specifies timing for delivery of the content of interest.

13. A non-transitory computer readable medium storing instructions which, when executed, are configured to cause a delivery server to perform operations of:
    receiving, at the delivery server, a first subscription message from a delivery client on a mobile device, the first subscription message including a subscription filter that specifies content of interest for a content-consuming application on the mobile device;
    sending to a content provider server after the receiving, a second subscription message which is different from the first subscription message, the second subscription message including the subscription filter for establishing a subscription to the content of interest on behalf of the content-consuming application;
    receiving, at the delivery server after the sending, a message from the content provider server that includes the content of interest and an identifier that identifies the subscription;
    receiving, at the delivery server, a rule specifying how the content of interest is to be delivered to the delivery client; and
    delivering a subset of the content of interest to the delivery client according to the rule.

14. The non-transitory computer readable medium of claim 13 wherein the rule specifies a priority for the ordering.

15. The non-transitory computer readable medium of claim 13 wherein the rule specifies a size for the content of interest.

16. The non-transitory computer readable medium of claim 13 wherein delivering comprises:
    sending a first portion of the content of interest that is less than or equal to the size specified by the rule; and
    caching a second portion of the content of interest, the first and second portions being an entirety of the content of interest.

17. The non-transitory computer readable medium of claim 16 wherein delivering further comprises:
 receiving, at the delivery server after sending the first portion, a request for the second portion.

18. The non-transitory computer readable medium of claim 13 wherein the rule specifies timing for delivery of the content of interest.

* * * * *